United States Patent [19]

Henzel

[11] Patent Number: 4,607,256

[45] Date of Patent: Aug. 19, 1986

[54] PLANT MANAGEMENT SYSTEM

[75] Inventor: Russell A. Henzel, Scottsdale, Ariz.

[73] Assignee: Honeywell, Inc., Phoenix, Ariz.

[21] Appl. No.: 540,061

[22] Filed: Oct. 7, 1983

[51] Int. Cl.[4] .................. H04Q 9/00; G06F 15/46
[52] U.S. Cl. .................. 340;825.52; 340/825.05;
  370/85; 364/186
[58] Field of Search .............. 340/825.05, 825.01,
  340/825.52, 825.22, 825.07, 825.17; 370/85;
  364/131–134, 146, 431.01, 138, 184–188;
  371/16, 18, 26

[56] References Cited

U.S. PATENT DOCUMENTS

| | | | |
|---|---|---|---|
| 4,251,858 | 2/1981 | Cambigue et al. | 340/825.17 |
| 4,271,505 | 6/1981 | Menot et al. | 370/85 |
| 4,296,464 | 10/1961 | Woods et al. | 364/200 |
| 4,347,563 | 8/1982 | Paredes et al. | 364/133 |
| 4,457,772 | 7/1984 | Haynes et al. | 364/138 |
| 4,500,951 | 2/1985 | Sugimoto et al. | 364/133 |

OTHER PUBLICATIONS

"Basic System, TDC 2000"; System Summary, SY-0-2-02, dated 6/81, pp. 1–12, Honeywell.

Primary Examiner—Donald J. Yusko
Attorney, Agent, or Firm—A. A. Sapelli; J. S. Solakian; A. Medved

[57] ABSTRACT

A plant management system is provided. The system includes one or more digital process control and data acquisition subsystems and a plant control network. Each control subsystem includes a data highway, and process control, and process interface units. The plant control network is a token-passing distributed plant control network in which a plurality of physical modules communicate with one another over a plant control bus. While there are limited number of different types with each type having different functions, all physical modules have common units, one of which is a module central processor unit. Both the number of modules and the number of types of modules of a plant control network have both a maximum and a minimum. Reliability of the plant management system is improved by a provision for redundancy at the physical module level. One type of physical module provides data communication and translation facilities between the plant control network bus and the data highway of a control subsystem. Another type of module provides a universal operator station at which is available all information and capabilities needed by an operator to operate a plant.

18 Claims, 7 Drawing Figures

PLANT MANAGEMENT SYSTEM

CROSS-REFERENCE TO RELATED APPLICATIONS

The following copending concurrently filed applications relate to the invention of the present application and are incorporated herein by reference:

A. "Method for Initializing a Token-Passing Local-Area Network" by Tony J. Kozlik, Ser. No. 06/540,216 filed Oct. 7, 1983; and B. "Method for Passing a Token in a Local-Area Network" by Tony J. Kozlik, Ser. No. 06/540,062 filed Oct. 7, 1983.

All the foregoing are assigned to the same assignee.

BACKGROUND OF THE INVENTION

1. Field of the Invention

This invention is in the field of distributed digital process control systems and, more particularly, relates to a plantwide system for monitoring and controlling industrial and electric utility plants, including intersystem communications and related plant management functions for plants ranging from modest to very large.

2. Description of the Prior Art

Digital process control and data acquisition systems such as that identified as the TDC 2000 process control system manufactured and sold by Honeywell Inc.'s Process Management Systems Division, for example, include a comprehensive set of algorithms and auxiliaries to control and monitor various manufacturing processes or the operation of utilities. The TDC 2000 Control System can be tailored to satisfy a wide range of process requirements at the loop or unit level. The TDC 2000 system includes standardized units that are linked together by a data highway, or common communication medium or bus, and each of the major units of such a system includes a microprocessor with its own firmware and data base to provide a distributed control system. Such distributed digital data acquisition and control systems to date have been essentially limited to controlling part of the processes conducted in petroleum refineries, for example, such as catalytic crackers, or in an electric utility plant the operation of boilers, generators, nuclear reactors, etc.

There is a need for a wider span, or degree, of control to permit plant-wide control of all the processes conducted by a given facility to improve efficiency and the products produced by large, complex industrial and utility facilities. Typically, attempts to do this, as taught by the prior art, have required large general-purpose, or large specialized, digital data-processing systems to provide a greater degree of control and information gathering capability over one or more control systems, such as that provided by the TDC 2000 Control System, hereinafter sometimes referred to as a process control subsystem, that do the actual controlling of processes or portions of processes performed. Typically, the analysis and special management functions needed to optimize processes, throughput, quality, to control inventory, etc., have been performed by data-processing systems that do not communicate directly, on a real-time basis, with process control subsystems as defined above. Thus, there exists a need for a higher level plant management system that can gather data on the operation of a total plant by continuously monitoring the performance of the various process control subsystems of the plant to provide plantwide control on a real-time basis.

One of the requirements of such a plant management system is for a high-performance universal operator station at which one or more operators can supervise and control the processes being executed by the plant, or the total operation of a large plant from raw material input to finished goods output. Such a system must also be reliable, fault tolerant, and preferably be sufficiently modular so that additional functions can be added as needed to tailor a plant management system to meet the specific requirements of any given manufacturing complex at a minimum of cost while at the same time providing a highly reliable system which can be readily modified to meet changing requirements placed on such a complex.

PRIOR ART STATEMENT

The following references are submitted under 137 CFR 1.9 (b):

Patent: U.S. Pat. No. 4,296,464, R. G. Woods, et al.

Publication: Basic Systems TDC 2000 System Summary SY-02-02, dated 6/81, 12 pages.

Woods, et al., discloses a process control system in which a large general-purpose, digital data-processing system provides the primary control for one or more digital process control and data acquisition subsystems.

The publication entitled "Basic System, TDC 2000 System Summary", provides information concerning the units and the functions of these units comprising a Honeywell TDC 2000 Process Control System.

SUMMARY OF THE INVENTION

The present invention provides a computerized plant management system, a token-passing network of up to "m" electronic modules of "p" types. Each such physical module when connected to the common communication medium, or bus, of the network has the capability of transmitting binary data, or information, to other physical modules of the network and of receiving information from them. Each of the physical modules of the network is the equal, or the peer, of the others, and each is assigned a different n bit physical network address. Whichever physical module "has the token" at any given instant of time has the sole right to transmit signals over the network bus and to transmit a token to its successor module.

Each of the physical modules includes a basic interface unit (BIU), a transceiver, a module bus, a module central processor unit and a module memory. Additional units, or devices, to provide a module with additional functional capabilities required by a module of a given type communicate with the other units of each module over the module's bus. One type of physical module of the plant control network is a universal operator station module which provides the means by which the operator responsible for the overall operation of the plant being supervised obtains the information needed to perform this function. To do this, the universal operator station has the capability of transmitting information, or commands, to control subsystems of the plant management system to provide the highest level of control over the processes being supervised. All communications between a universal operator module and other modules of the network are via the network's communication media, or plant control bus, which provides the universal operator station module with access to the data highways of any digital process control and data acquisition subsystems of the plant management system and over such data highways access to the units of each control subsystem of the plant management system.

There are several standardized types of physical modules that are used in forming the plant control network of a plant management system. One such type of module is a highway gateway module, the function of which is to provide data communication and translation facilitites between the plant control bus of the network and the data highway of a digital process control and data acquisition subsystem. A gateway module thus provides other modules of the plant control network access to data available at the units of a process control and data acquisition subsystem as needed.

Another type of physical module of the plant control network, named a history module, includes a mass-memory storage device, or a mass data storage device, such as a disc digital data storage unit. The disc storage unit of a history module permits nonvolatile data storage and retrieval of large volumes of binary data. Types of data stored by such a unit would be trend histories, displays, and to provide backup storage for programs for the units of the control subsystems of the plant management system, for example.

Yet another type of physical module of the plant network, an application module, provides additional general-purpose data-processing capabilities which are particularly useful in conjunction with, or in support of, the process control subsystems. Typically, application modules are used to acquire additional data, to produce new or modified process control algorithms, to collect information concerning batch processes, as well as to provide additional computational facilities relative to the optimization of plant processes being supervised.

Still another type of physical module, a computer module, provides for the real-time exchane of information between modules of the plant control network of the plant management system and a medium- or large-scale, general-purpose data-processing system. Typically, functions of such general-purpose computers provide, in a plant environment, supervisory optimization, generalized program prepartion, and execution facilities for programs written in high-level program languages. Additional types of modules permit communication between one plant control network of the present invention and another such network, if desired.

The plant control system of this invention consists of a number of electronic modules which communicate with one another over a high-speed bit serial plant control bus. Each of the modules includes a module CPU and a module memory with additional controllers and devices being added to provide the desired functionality or functionalities required of a given type of physical module, such as that of a universal operator station module, etc. This architecture creates a distributed processing environment which provides for improved reliability and performance over centralized systems. Reliability is improved because, if one module of the system fails, the others will remain operational and the system as a whole is not disabled as would be the case with the failure of a centralized system. Performance is improved and faster response times are obtained as a result of the increased computer processing resources available in each physical module, as well as a result of the concurrency and parallelism in processing data provided by these resources. Reliability is improved by redundancy of physical modules of the plant control network of the system to the extent necessary to achieve desired system availability. Any network module of a given type may have one or more standby, or backup, modules of the same type, which backup modules maintain data synchrony, but not operational synchronism with their associated primary module. A standby secondary, or backup, module takes over performance of the functions of its primary module should the primary module fail. This type of redundancy provides a level of fault tolerance which can be incrementally increased to a desired level.

It is, therefore, an object of the invention to provide a plant management system that is capable of providing plant-wide control and data acquisition functions by communicating directly and on a real-time basis with one or more process control subsystems of the system, and in which relevant data needed for the efficient operation of the total plant is available to all data-processing resources of the system.

Another object of this invention is to provide a highly reliable plant management system which includes a token-passing local control network consisting of a plurality of different types of physical modules, at least one module of each type being designated as a primary module with some or all primary modules having one or more backup modules, which backup modules take over the performance of their primary module if its primary fails.

It is yet another object of this invention to provide a plantwide system in which additional functional capability can be provided incrementally and existing capabilities can also be increased incrementally.

BRIEF DESCRIPTION OF THE DRAWINGS

Other objects, features, and advantages of the invention will be readily apparent from the following description of certain preferred embodiments thereof taken in conjunction with the accompanying drawings, although variations and modifications may be effected without departing from the spirit and scope of the novel concepts of the invention and in which.

DESCRIPTION OF THE INVENTION

Figure 1:
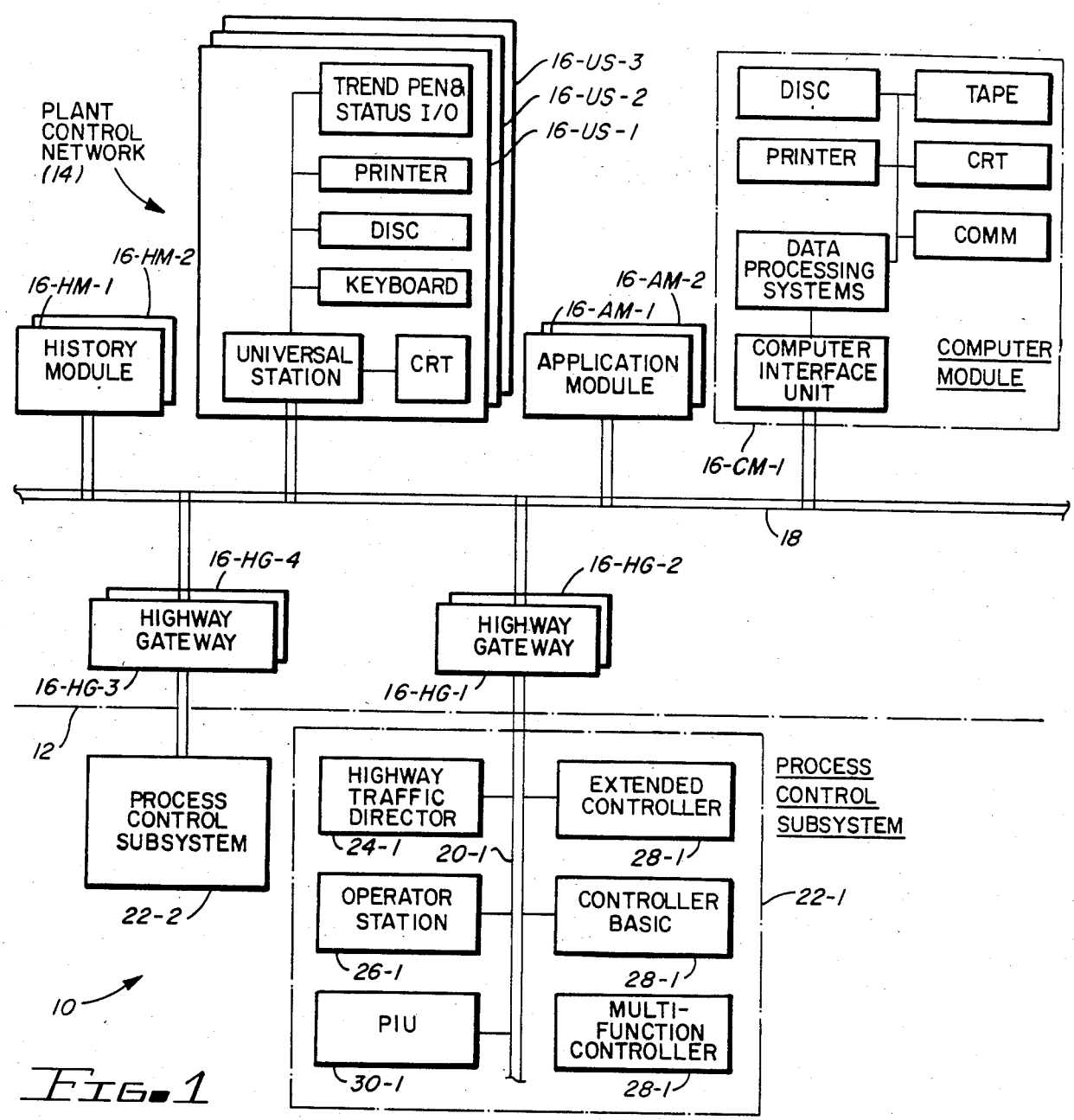
FIG. 1 is a schematic block diagram of the plant management system of this invention.

The organization, or architecture, of plant management system 10 is illustrated in FIG. 1. The elements above dashed line 12 of FIG. 1 form, or constitute, plant control network 14, a token-passing distributed local-area network. Physical modules 16 of network 14 are of various specialized functional types, as will be described below. Each physical module 16 is the peer, or equivalent, of others in terms of right of access to the network's communication medium, or plant control bus, 18, for the purpose of transmitting data to other modules 16 of network 14. Highway gateway module 16-HG-1 provides communications and data translation facilities between plant control bus 18 and data highway 20-1 of distributed digital process control and data acquisition subsystems 22-1, as illustrated in FIG. 1. Highway gateway module 16-HG-2 is a backup, or standby, module for its primary module 16-HG-1 and takes over its functions if module 16-HG-1 should fail. Highway gateway module 16-HG-3 provides communications and data translation facilities between plant control bus 18 and the data highway of control subsystem 22-2. Module 16-HG-3 is a primary module backed up by its secondary, or backup, module 16-HG-4. Each of the process control subsystems 22-1 and 22-2 is, in the preferred embodiment, a Honeywell Inc. TDC 2000 Process Control System, a description of which is found in the publication entitled "System Summary", which publication is more completely identified in the Prior Art Statement supra.

Control subsystem 22-1 may include units, in addition to data highway 20-1, such as a highway traffic director 24-1, an operator station 26-1, several different types of controllers 28-1, such as basic, multifunction, or extended, and process interface units (PIU's) 30-1. Details of control subsystem 22-2 are not illustrated since they are substantially similar to those of subsystem 22-1. The data highway 20 in each control subsystem 22 is a dual redundant communication bus consisting of two separate coaxial cables. A highway traffic director 24 monitors and coordinates all communication traffic between data highway units, or devices; i.e., PIU's 30, controllers 28, operator station 26, etc. Controllers 28 have the functional capabilities of several conventional single-loop process controllers plus enhanced functionality. Multifunction, or batch, controller 28 is designed to control noncontinous, or batch-type processes. Operator station 26 provides an interface between the process operator and the process being controlled by a control subsystem 22, for example. Process interface units 30 scan each input point to which they are connected, to measure temperature, pressure, flow rates, etc., to digitize this information, and make such information available to other devices of its subsystem 22 on demand. For additional details of the various types of devices which may form, or be included in, a process control subsystem 22, reference is made to the System Summary publication identified in the Prior Art Statement.

Universal operator station module 16-US-1 of network 14 is the work station for one or more plant operators. It includes an operator console which is the interface between the plant operator, or operators, and the process or processes of the plant for which they are responsible. Each universal operator station module, such as 16-US-1, and its backup modules 16-US-2 and 16-US-3, for example, is connected to plant control bus 18, and all communications between the primary universal operator station module, such as 16-US-1, and any other module 16 of network 14, including its backup modules 16-US-2 and 16-US-3, is by means of plant control bus 18. Universal operator station module 16-US-1 has access to data that is on control bus 18 and the resources and data available through, or from, any of the other modules 16 of network 14. Each universal station module 16-US includes a cathode ray tube display, designated CRT, which includes a video display generator; an operator keyboard, a floppy disc data storage device, trend pen recorders, and status displays, for example.

Another type of physical module that can be included in local control network 14 is history module 16-HM-1 and its backup module 16-HM-2, which provide mass data storage capability. Each module 16-HM includes at least one conventional disc mass-storage device such as a Winchester disc, which disc storage device provides a large-volume of nonvolatile, nonremovable storage capability for binary data. The types of data stored by such a mass-storage device are typically trend histories, or data from which such trends can be determined, data that constitutes, or forms, CRT-type displays, copies of programs for the units of the control subsystems 22, for modules 16, or for units of the modules 16 of plant control network 14. In the preferred embodiment, a disc data storage unit of a history module such as 16-HM-1 can store up to 32.5 megabytes of data.

Another type of module that can be incorporated into the network 14 is an application module 16-AM-1. The backup module for primary module 16-AM-1 is designated in FIG. 1 as 16-AM-2. Primary application module 16-AM-1 provides additional data-processing capability in support of the process control functions performed by the controllers 28 of process control subsystems 22-1 and 22-2 of plant management system 10, such as data acquisition, alarming, batch history collection, and provide continous control computational facilities when needed. The data processing capability of an applicaton module 16-AM is provided by its module processor and module memory.

Computer module 16-CM-1 uses the standard or common units of all physical modules to permit a medium-to-large scale, general-purpose data-processing system to communicate with other modules 16 of network 14 and the units of such modules over bus 18 and the units of control subsystems 22 via a highway gateway module 16-HG. Data-processing systems of a computer module 16-CM-1 are used to provide supervisory, optimization, generalized user program preparation and execution of such programs in higher-level program languages. Typically, the data-processing systems of a computer module 16-CM-1 have the capability of communicating with other such systems by a communication processor and communication lines, as is well known in the art. While a backup computer module could be provided, the cost of providing one compared with benefits of doing so weigh against doing so at this time.

Plant control bus 18 is a high-speed, bit serial dual redundant communication bus that interconnects all the modules 16 of plant control network 14. Bus 18 provides the only data transfer path between the principal sources of data, such as primary highway gateway modules 16-HG-1 and 16-HG-3, primary application module 16-AM-1, and primary history module 16-HM-1; and principal users of such data, such as primary universal operator station module 16-US-1, computer module 16-CM-1, and application module 16-AM-1. Bus 18 also provides the communication medium over which large blocks of data, such as memory images, can be moved from one module 16, such as history module 16-HM-1 to universal station module 16-US-1. Bus 18 is dual redundant in that it consists of two coaxial cables 18-1 and 18-2 that permit the serial transmission of binary signals over both at a rate of five megabits per second. The length of coaxial cables 18-1 and 18-2 is limited to 300 meters in the preferred embodiment. The maximum number of modules 16, including primary and backup modules 16 that may theoretically be connected to bus 18 is limited to 128, which, in binary notation, is $2^7$; however, for reasons to be explained later, the number of modules that may be connected to a control bus 18 is limited to 64, or $2^6$.

Figure 2:
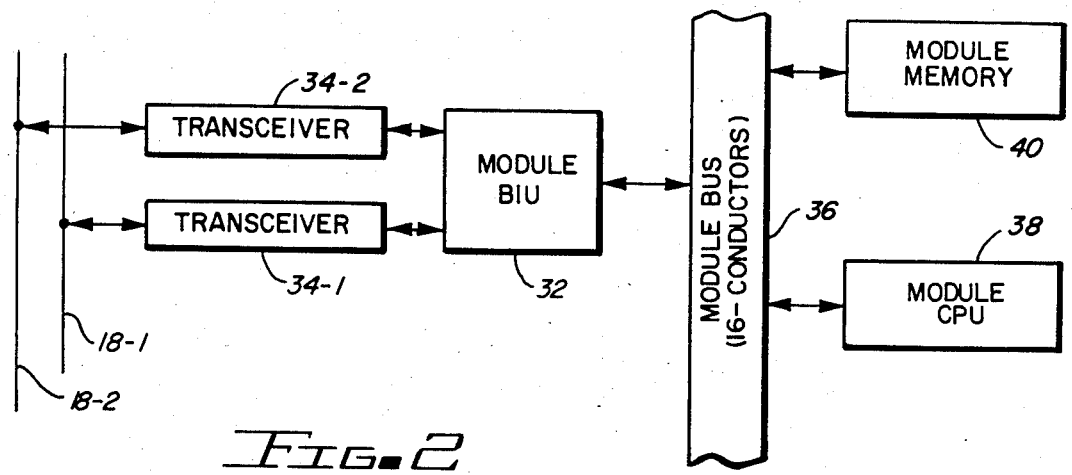
FIG. 2 is a schematic block diagram illustrating the common elements of each physical module of the plant control network of the system.

Each of the physical modules 16 includes certain, or required, standard units, which are illustrated in FIG. 2. Each module 16 has a module bus interface unit, BIU, 32 which is connected to the two coaxial cables 18-1 and 18-2 of plant control bus 18 by a pair of transceivers 34-1 and 34-2. Additional details of module BIU 32 are illustrated and described in the cross-referenced applications entitled "Method for Initializing a Token-passing Local-Area Network" and "Method for Passing a Token in a Local-Area Network", the disclosures of which are incorporated by reference into this application. Each module 16 is also provided with a module bus 36 which, in the preferred embodiment, is capable of transmitting 16 bits of data in parallel, a module CPU 38 and a module memory 40. Other units to tailor each type of module 16 to satisfy its functional requirements are operatively connected to module bus 36 so that each such unit can communicate with the other units of a module 16 via its module bus 36. The BIU 32 of the module 16 that has the token at any given time is enabled to transmit data on, or over, bus 18. In the preferred embodiment, all transmissions by a BIU 32 are transmitted simulataneously, or in parallel, over coaxial cables 18-1 and 18-2. However, a BIU 32 of a module 16, when receiving information transmitted by another module 16 over coaxial cables 18-1 and 18-2, enables only one of its two transceivers 34 to transmit received binary signals to its associated BIU 32. Which transceiver 34-1 or 34-2 is enabled at any given time to receive signals from cables 18-1 or 18-2 is determined by the module's CPU 38 or by its BIU 32, depending on the circumstances; namely; how each is programmed to function, as is well known in the art. In addition, each BIU 32 has two receive channels, which are not illustrated, with each receive channel including a string of receive buffer registers. Each BIU 32 can be programmed so that all short frames of information go to one such receive channel while all long frames go to the other receive channel. Alternatively, all high-priority frames can be sent to one receive channel, while all low-priority frames go to the other.

Network 14 utilizes the method for initializing a local-area token-passing network described and claimed in the cross-referenced application entitled "Method for Initializing a Token-Passing Local-Area Network" and the token-passing algorithm described and claimed in the cross-referenced application entitled "Method for Passing a Token in a Local-Area Network". Each physical module 16 connected to bus 18 is assigned a unique physical address, a 7-bit address in the preferred embodiment. As stated above, a maximum of only sixty-four physical modules 16 are connected to control bus 18. A reason for this is that when two plant control buses 18 are connected by a gateway module, a single network is formed in which each module has a unique physical address. This permits the modules 16 of two plant control networks 14 to directly communicate with one another and to form a single logical ring from the modules 16 thereof.

Figure 3:
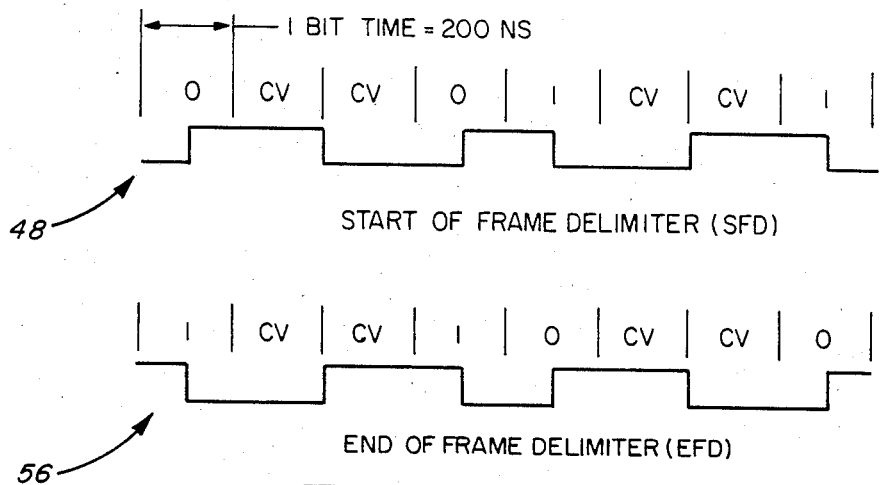
FIG. 3 illustrates the wave forms of start-of-frame and end-of-frame delimiters.
Figure 4:
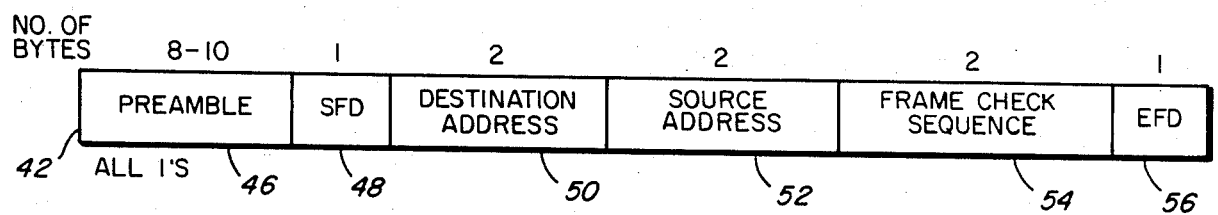
FIG. 4 is the format of a token-passing frame.
Figure 5:
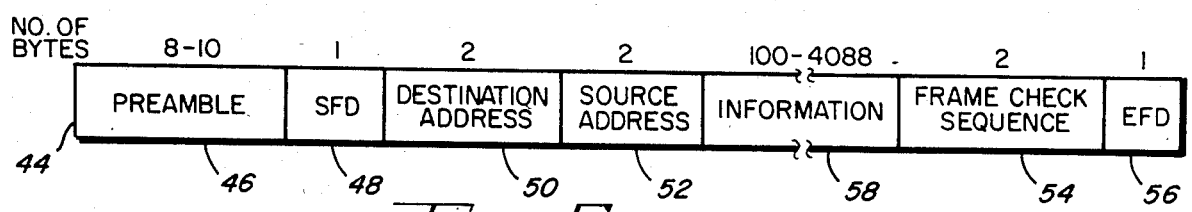
FIG. 5 is the format of an information frame.

Information is transmitted between modules of network 14 by frames of two types, a token-passing frame, or token, 42, such as is illustrated in FIG. 4, and an information frame 44 as illustrated in FIG. 5. A token-pass frame 42 includes from 8 to 10 bytes of a preamble 46. Preamble 46 consists of signals of the same type, such as logical ones. Preamble 46 is followed by a start-of-frame delimiter, SFD 48, of one byte, destination address field 50 of two bytes, a source address field 52 of two bytes, a frame check sequence 54 of two bytes, which sequence is used to detect errors in frame 42, and an end-of-frame delimiter, EFD 56, of one byte. In FIG. 3, the wave forms of start-of-frame delimiter, SFD 48, and of end-of-frame delimiter 56, EFD, are illustrated.

The information transmitted by the BIU 32 of each module 16 consists of binary signals which are Manchester encoded so that a receive clock can be derived from the signals as received by each receiving BIU. In the preferred embodiment, a logical zero is transmitted by the signal voltage level being low initially, or during the first half of the bit cell, and being high during the second half of the bit cell, a mid-bit low-to-high transition. A logical one is transmitted by the signal voltage level initially during the first half of the bit cell being high and being low during the second half, a mid-bit high-to-low transition. Manchester encoding requires that there always be a transition in the middle of each bit cell. If there is no such transition, a code violation, CV, occurs. Both start- and end-of-frame delimiters 48, 56 include code violations, four CV's each. By using CV's in this manner, a 4- bit error would have to occur to change valid data into a frame delimiter. An end-of-frame delimiter 56 is used rather than silence on bus 18 to avoid the possibility that reflections of signals on bus 18 would be interpreted as a transmission, after transmission by the BIU 32 having the token 42 at any given time, for example, has stopped. An antijabber timer of each BIU 32 inhibits the continuous transmission of signals by a BIU for more than a predetermined period of time, which period is substantially longer than is required to transmit the largest information frame 44. The timer is reset each time a BIU stops transmitting.

Referring to FIGS. 4 and 5, it can be seen that the format of an information frame 44 differs from that of a token-pass frame 42 only by including an information field 58. In the preferred embodiment, field 58 is limited to include between 100 and 4,088 bytes of binary data. All other fields of an information frame 44 are the same as that of token-pass frame 42.

Figure 6:
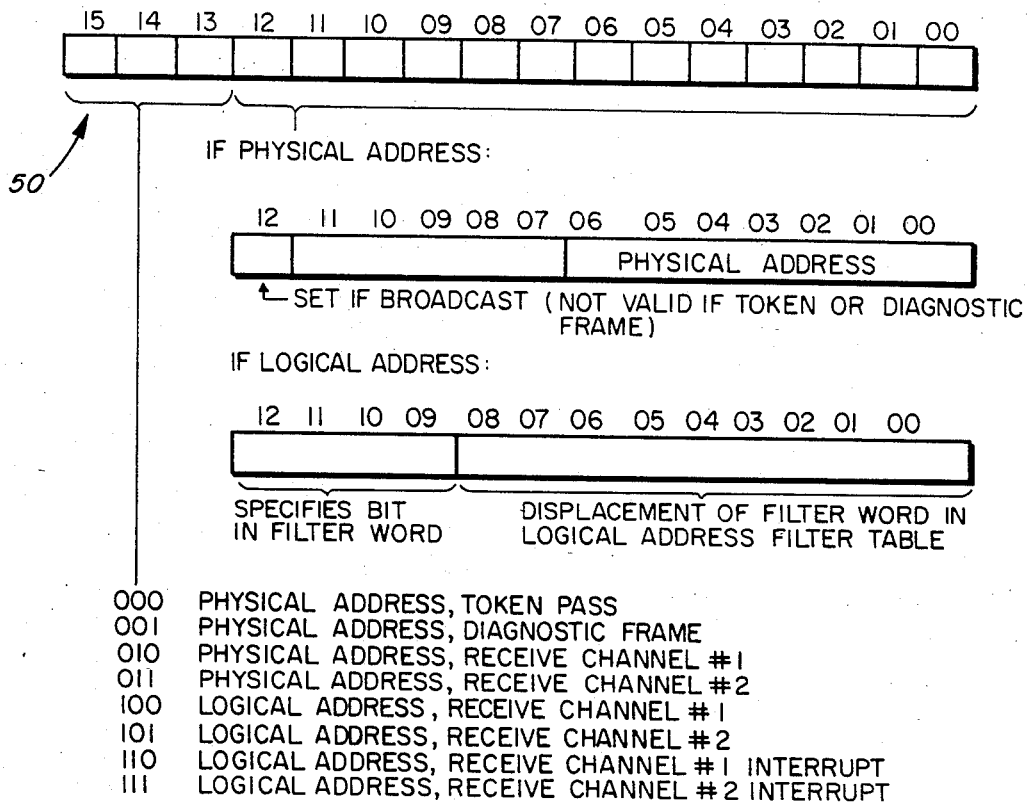
FIG. 6 defines the significance of various bit configurations of a destination address field of a frame.

In FIG. 6, the significance of the bit positions of a destination address field 50 of a frame is explained. A frame, either a token-passing frame 42 or an information frame 44, is defined as packet of a message formatted for transmission over plant control bus 18. In the preferred embodiment, there are two basic types of addresses: a physical address and a logical address. A physical address is the address of a given physical module 16, and field 50 is identified or decoded as being that of a physical module 16 when the most significant bit, bit position 15 of field 50, is a logical zero. Each module 16 has a unique 7-bit physical address. Typically, the physical address of a physical module 16 is determined by a multi-bit switch or by a series of mechanically-made circuit interconnections, or the like, mounted, in the preferred embodiment, on the printed circuit board of the module containing one of its transceivers 34. A token-pass frame 42 is identified by the three most significant bit positions, bits 15, 14, and 13 being logical zeros. The lower order seven-bit positions, bit positions 06-00, are the physical address of the physical module 16 to which a token 42, for example, is addressed. If bit positions 15 and 14 are logical zeros and bit position 13 is a logical one, then the frame is a diagnostic frame addressed to the module 16 whose physical address corresponds to that of, or equals that defined by, the bits in the lower order seven bit positions of field 50. A diagnostic frame is a form of an information frame 44 and can be used to determine if a given problem or set of problems exist in the addressed module. If bits 15 and 14 are logical ones, then bit 13 designates which of the two receive channels of the addressed module's BIU 32 is to accept and process the frame. If bit 12 is set and the address is a physical address but not a token or a diagnostic frame, the frame is to be received, or is addressed to all physical modules 16 of network 14.

A logical one in bit position 15 indicates that the address defined by the bits of the lower order bit positions, 12 through 00, is that of a logical entity or logical module where a logical entity or module is a program module or set of data. If bit 14 is a zero under such circumstances, then bit 13 designates which receive channel of the addressed BIU is to receive, or process, the frame. If bits 15 and 14 are both logical ones, then the frame is an interrupt, a high-priority message, and bit 13 designates the receive channel of the BIU to receive the interrupt.

A module's BIU 32 determines which logically addressed frames transmitted over bus 18 are addressed to it. In the preferred embodiment, there can be up to 8K different logical addresses where $K=2^{10}$. A BIU 32 determines if it is to accept an information frame with a logical address by means of a logical address filter table. The lower order 9 bits of the address field are the address of two bytes of data, a filter word, which is stored at each addressable location in the filter memory of each BIU. The higher order 4 bits of the logical address, bit positions 12-09, specify a bit position of the addressed filter word. If that bit is a logical one, then that frame is accepted by the module since it is addressed to a logical module or program stored in that module's memory 40.

Each type of module 16 is comprised of hardware devices which are physically packaged together and designed to support a particular set of functions. The unit of redundancy in the network 14 is the physical module 16. A redundant, secondary, or backup, module 16 must be of the same type as its primary module so that both will have the same complement of hardware units. Each type of module 16 of network 14 is capable of having one or more backups.

Each of modules 16 includes a module central processor unit 38 and a module memory 40, a random-access memory, and such additional controller devices, or units, which are configured to provide the desired functionality of that type of module; i.e., that of the operator station 16-US, for example. The data-processing capabilities of each module's CPU 38 and module memory 40 create a distributed processing environment which provides for improved reliability and performance of network 14 and plant management system 10. The reliability of network 14 and plant management system 10 is improved because, if one module 16 of network 14 fails, the other modules 16 will remain operational. As a result, network 14 as a whole is not disabled by such an occurrence as would be the case in centralized systems. Performance is improved by this distributed environment in that throughput and fast operator response times result from the increased computer processing resources, and the concurrency and parallelism of the data-processing capabilities of the system.

Network 14 uses redundancy at the module 16 level to achieve the required system availability. Each physical module 16 of a given type may have one or more standby modules which maintain data synchrony, but not operational synchronism with the primary module. The secondary module takes over the operations or functions of its primary when the primary module with which it is associated fails. The existence of one or more redundant backup modules for each primary module is invisible to all applications which interface with the primary module. The primary module is the only one that is aware of the existence of its own backup units. Where the requirements to manage a plant require it, network 14 can have more than one primary module of each type. The only limitation is that the total number of primary and secondary modules of all types connected to bus 18 not exceed a predetermined maximum, 64 in the preferred embodiment.

Each module 16 is responsible for the integrity of its own operation. The failure of a module 16 is detected by the module itself and, if it does detect such a failure, it will cease operatin and send a terminating state, or status, message. Under certain circumstances, a module's bus interface unit 32 will send out a failed status message if its antijabber timer times out, for example. If a module, as a whole, is unable to send out a failed state or status message, its backup module will detect the failure of its primary because of the absence of periodic status messages which are transmitted by a primary module to its backup modules. A backup, or secondary, module 16, upon receipt of a terminating or failed status message, or, upon the absence of the receipt of its associated primary module's status message, starts operating as a primary module. The functions performed by each physical module are controlled by its programming, and each program entity, or program module, is assigned a logical address which is sometimes referred to as a logical module. The redundant, or backup, physical modules will contain the same set of logical functions or logical modules as their primary. It should be noted that the backup modules for a primary physical module of one type must be of the same type as its primary.

Figure 7:
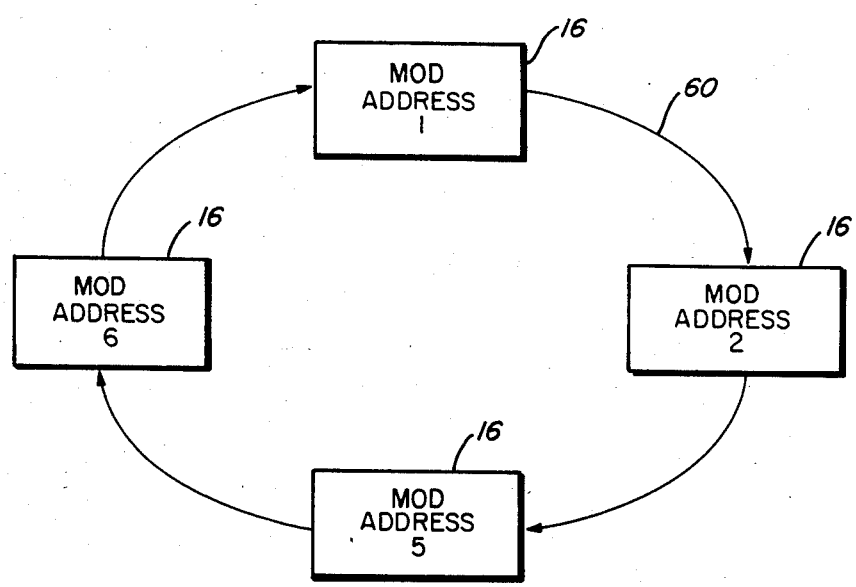
FIG. 7 illustrates a logical ring formed by the modules of the plant control network of the system.

Network 14 is initialized, as described in the cross-referenced application entitled "Method for Initializing a Token-Passing Local-Area Network", and, after the logical ring 60, as illustrated in FIG. 7, consisting of the existing properly functioning physical modules 16 is initialized, the method by which a token 42 is passed between the predecessor and successor modules 16 is described in the cross-referenced application entitled "Method for Passing a Token in a Local-Area Network". Each physical module 16, as it accepts a token, does so by transmitting, within a predetermined period of time after receiving a token 42 addressed to it, an information frame 44 if available and then a token 42 addressed to its successor, physical module 16. An information frame 44 can supply information, can request information, or can issue instructions to one or more physical modules 16 or logical modules. To simplify network 14, each module 16 is limited to transmitting one information frame 42 each time it receives a token 44 addressed to it, or while it has the token.

One of the functions that each module 16 must perform that receives a frame other than a token frame 42 is to transmit to the physical module 16 that originated or transmitted the frame the fact that the addressed module has received the frame addressed to it. Backup modules are not programmed to accept logically addressed information frames addressed to their primary module. Periodically, such as once each half-second, each primary module will update its backup modules so that the backup modules will be in condition to assume the functions of its primary with a minimum of delay. The failure of a primary module to update its secondary module, or modules, within an allotted period of time, will cause its secondary, or one of its secondary physical modules, to become the primary and perform the functions of its primary physical module. This is done by changing the contents of the decoding key of the secondary module to that corresponding to its primary.

Since the uncontained failure of a plant control system could do substantial damage to life, to the physical plant, and to product quality; dependability is a fundamental requirement of any such system. High availability with unimpeachable integrity, as well as graceful failure characteristics are the result of the architecture of the plant management system of this invention. Another function of the system of this invention is to provide a human interface to the plant as a whole. Of the categories of humans who need access to plant management system 10, the plant operator is the most important as he is responsible for the safety and performance of the plant. Plant management system 10 is, therefore, primarily intended to aid in that task. To accomplish this, a universal operator station module 16-US of network 14 provides a single window to the entire plant process; i.e., it provides access to all the data of system 10 and presents whatever data is required in forms best suited for the operator's understanding, such as alarm patterns, trends, which are pictorially depicted, as well as printed and annunciated messages or warnings, where appropriate, at one place and with a minimum of delay.

The control functions of plant control network 14 are compatible with those of several control subsystems 22 and for both continuous and discontinuous processes. System 10 can be tailored to the requirements of a given plant and can be readily expanded, or modified, as a given plant expands, or changes, without a major reconfiguration of system 10. This is achieved by using a limited number of types of physical modules 16 which communicate with one another over the plant control bus.

What is claimed is:

1. A plant management system, comprising:
    a digital process control and data acquisition subsystem including process controller and process interface units and a data highway, said units communicting with one another by means of the data highway; and
    a token-passing plant control network, said network including:
    communication bus means;
    a plurality of module means of differing types communicating with one another by transmitting and receiving binary signals over the bus means;
    one type of said module means providing communication between modules of the control network and units of said subsystem utilizing the data highway of said subsystem; and
    a second type of said module means providing a plant-wide operator control station.

2. A plant management system as defined in claim 1 in which for each type of module means one of each of said types is designated as a primary module means for performing a given set of functions, and one or more module means of the same type are designated as a backup module means, a backup module means taking over the functions of its primary module means when the primary fails.

3. A plant management system as defined in claim 2 in which the communication means transmits binary signals, bit serially.

4. A plant management system as defined in claim 3 in which the communication means is a coaxial cable.

5. A plant management system as defined in claim 4 in which the communication means is dual redundant and is comprised of two coaxial cables.

6. A plant management syste as defined in claim 2 in which each module means includes transceiver means, bus interface means, module bus means, module central processor means, and module memory means.

7. A plant management system as defined in claim 6 in which the control network further including a third type of module means in which the module central processor means provides the data-processing support for the process controller units of the digital process control and data acquisition subsystem.

8. A plant management system as defined in claim 6 in which the plant control network further includes a fourth type of module means for storing large amounts of digital data.

9. A plant control managerial system as defined in claim 6 in which the control network further includes a fifth type of module means which includes a general-purpose, digital data-processing system.

10. A plant management system comprising:
    a digital process control and data acquisition subsystem including a data highway, process controller, and process interface units which communicate over said data highway; and
    a token-passing plant control network, said network including:
    plant control bus means;
    "m" module means of "p" different types which communicate with one another by transmitting and receiving binary signals over the bus means, where "m" and "p" are integers greater than zero, and m is greater than p, each of said module means including module bus means, module central processor means, and module memory means;
    highway gateway type module means for providing communication between the bus means and the data highway of said subsystem so that the modules of the control network can communicate with units of said subsystem; and
    universal operator station type module means for providing an interface between the plant management system and a human operator.

11. A plant management system as defined in claim 10 in which the control network further includes computer type module means for providing a large-scale, general-purpose digital data-processing capability.

12. A plant management system as defined in claim 10 in which for each type of module means one module of each of said types is designated as a primary module means for performing a given set of functions and one or more module means of the same type are backup module means which assume the functions of their primary when the primary fails.

13. A plant management system as defined in claim 12 in which more than one module means of a given type can be designated as a primary module means, and each such primary module means can have one or more backup module means.

14. A plant management system as defined in claim 13 in which the binary signals transmitted over the bus means are transmitted serially.

15. A plant management system as defined in claim 14 in which the bus means is a coaxial cable.

16. A plant management system as defined in claim 15 in which the communication means is dual redundant and is comprised of two coaxial cables.

17. A plant management system as defined in claim 16 in which each module further includes a pair of transceiver means and bus interface means, one of said transceiver means connecting one coaxial cable of the bus means to its associated bus interface unit, and the second transceiver connecting the second coaxial cable to the bus interface unit, the bus interface unit being operationally connected to the module bus means of the module.

18. A plant management system as defined in claim 17 in which the maximum value of "m" is sixty-four and the minimum value is two, and the maximum value of "p" is five and the minimum value is two.

* * * * *